UNITED STATES PATENT OFFICE.

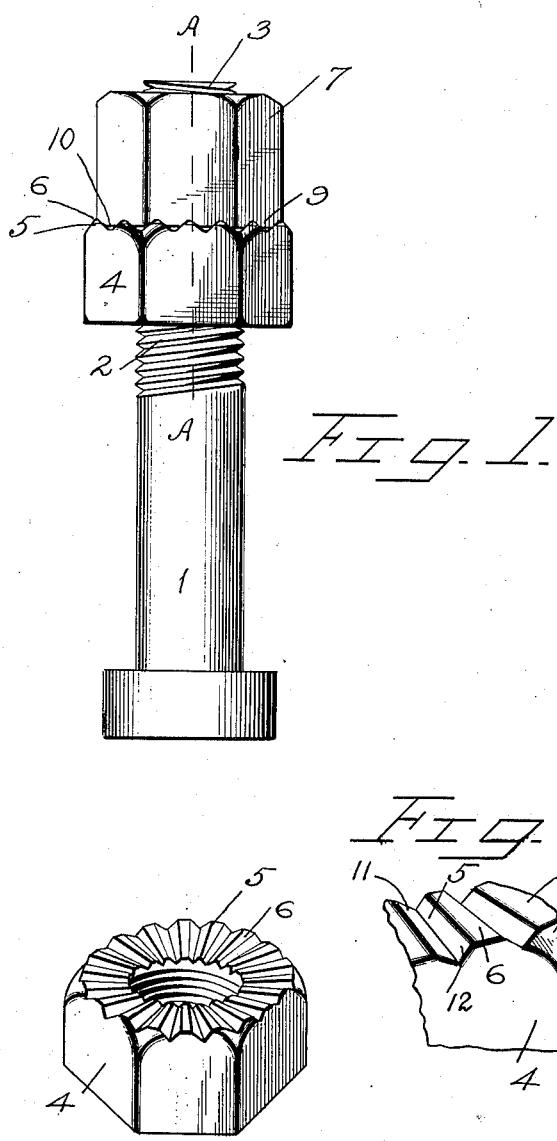

ISAAC C. DAKIN, OF WEST NEWTON, PENNSYLVANIA.

NUT-LOCK.

1,007,925.  Specification of Letters Patent.  Patented Nov. 7, 1911.

Application filed November 21, 1910. Serial No. 593,443.

*To all whom it may concern:*

Be it known that I, ISAAC C. DAKIN, citizen of the United States, residing at West Newton, in the county of Westmoreland and State of Pennsylvania, have invented certain new and useful Improvements in Nut-Locks, of which the following is a specification.

This invention relates to improvements in nut locks, and the object of the invention is to provide an inexpensive, effective, and durable nut lock.

Another object of the invention is to provide a nut lock which may be used constantly and locked and unlocked at will.

With the above and other objects in view, I have invented the nut locking means illustrated in the accompanying drawings, in which, Figure 1 is an elevation of my improved nut lock, Fig. 2 is a longitudinal sectional view taken on line A—A of Fig. 1, showing the bolt partly in elevation, Fig. 3 is a perspective view of a nut, and Fig. 4 is an enlarged fragmental view showing a detail of the nut teeth.

Referring to the drawings, 1 is a screw threaded bolt, being provided with a right hand screw portion 2 and a left hand screw portion 3, the latter portion being reduced in size. A nut 4 is adapted to slip over the reduced portion of the bolt and screw onto the enlarged portion thereof. The outer surface of the nut is provided with teeth 5, which have a flattened outer surface as at 6, and both sides of the teeth 11 and 12 are inclined at an equal angle toward the top of the surface 6. A smaller nut 7 having a recess 8 therein is also provided with teeth 9 on its inner surface. These teeth have flattened edges 10. This nut is screw threaded to screw onto the reduced end of the bolt and the teeth 9 are adapted to interlock with the teeth 5 on the large nut. The recess 8 in the smaller nut is adapted to pass over the larger portion of the nut so that the teeth of the two nuts may contact one another. When the two nuts are screwed tightly against one another, the teeth will interlock and both nuts will therefore be held against movement. As the teeth are flattened and inclined on both sides, the nuts can be forced into or out of locking engagement with one another.

Having described my invention, I claim and desire to secure by Letters Patent:—

1. In a nut lock, a bolt having right and left threads thereon, nuts adapted to screw onto said right and left threaded bolt, teeth on said nuts, said teeth having flattened outer surfaces.

2. In a nut lock, a bolt having right and left threads thereon, nuts adapted to screw onto said right and left threaded bolt, teeth on said nuts, said teeth having flattened outer surfaces, and inclined sides.

3. In a nut lock a bolt having right and left threads thereon, nuts adapted to screw onto said right and left threaded bolt, teeth on said nuts, said teeth having flattened outer surfaces and inclined sides, the inclination of said sides being the same.

4. In a nut lock a bolt having right and left threads thereon, nuts adapted to screw onto said right and left threaded bolt, teeth on said nuts, said teeth having flattened outer surfaces and inclined sides, the inclination of said sides being the same, said teeth being provided on the entire abutting surfaces of said nuts.

In testimony whereof I affix my signature, in presence of two witnesses.

ISAAC C. DAKIN.

Witnesses:
   J. O. LANDSPARGER,
   A. T. DARR.